(No Model.)

G. L. MOTTER.
COLANDER STEAMER.

No. 401,712. Patented Apr. 16, 1889.

ATTEST.
Victor J. Evans.
Chas. E. Hunt.

INVENTOR.
George L. Motter,
By W. A. Redmond
Atty.

UNITED STATES PATENT OFFICE.

GEORGE L. MOTTER, OF RICH HILL, MISSOURI.

COLANDER-STEAMER.

SPECIFICATION forming part of Letters Patent No. 401,712, dated April 16, 1889.

Application filed March 10, 1888. Serial No. 268,315. (No model.)

*To all whom it may concern:*

Be it known that I, GEORGE L. MOTTER, a citizen of the United States, residing at Rich Hill, county of Bates, and State of Missouri, have invented certain new and useful Improvements in Colander-Steamers; and I do hereby declare the following to be a full, clear, and exact description of the invention, such as will enable others skilled in the art to which it appertains to make and use the same.

This invention relates to culinary vessels of that class known as "steamers" and "colanders," and it has for its object to provide a simple, inexpensive, and durable culinary vessel of the class named, which may be used either as a colander for straining liquids off vegetables or meats, or as a steamer or steam-cooker; and it consists of the parts and combinations of parts hereinafter described and claimed.

Figure 1:
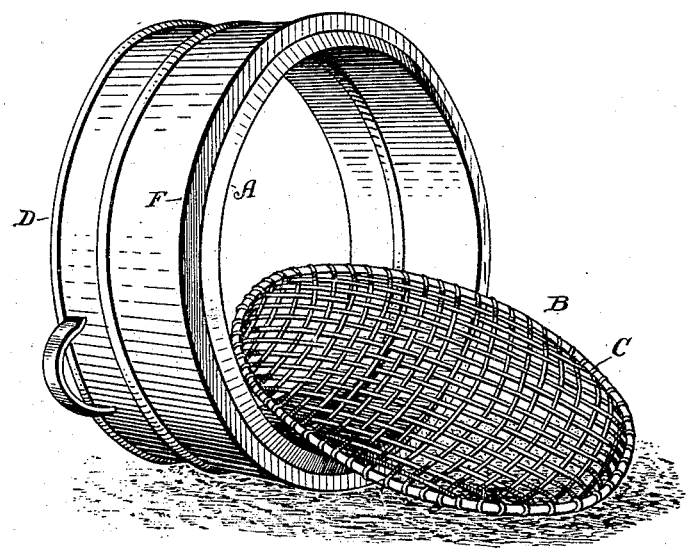
Figure 2:
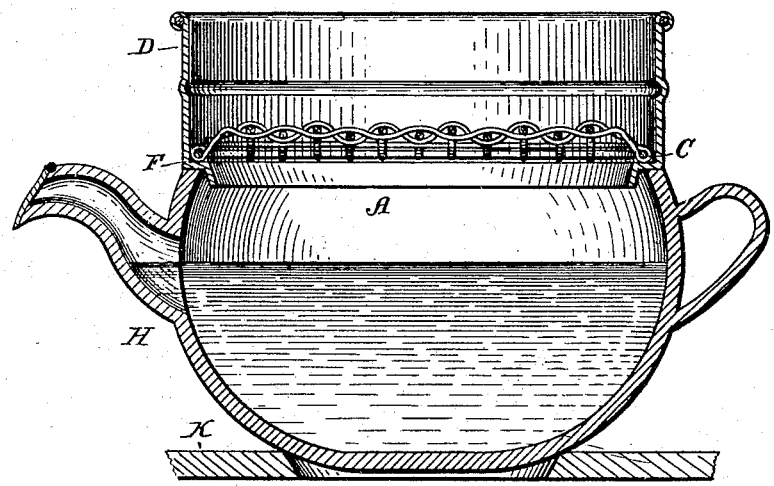

In the accompanying drawings, forming a part of this specification, Figure 1 is a perspective view of my improved utensil; and Fig. 2, a vertical section through the same and a steam-generator.

D represents the steaming-vessel, which is made of any desired kind of sheet metal in cylindrical form, and is provided with handles and a suitable lid. At the bottom of the vessel D a narrow flange, F, is formed, which projects laterally and inwardly at right angles all round the edge of the bottom, as clearly shown in the drawings. A tapering flange, A, projects downward and inward from the edge of flange F. The flange A may be struck out of the same piece of metal forming the flange F, or it may be soldered thereto, as found most convenient.

B represents the perforated bottom for the vessel D. This bottom is formed, preferably, of wire-netting having a wire, C, woven in the edge of the netting to strengthen the same. The netting extends at an angle from the wire C or is turned up or pressed by a die into the pan shape shown, forming an inclining wall, so as to conform to the shape of the flange A. The wire C, forming the edge or periphery of the bottom, rests on the flange F of the vessel when said bottom is in position in the vessel, and the beveled portion of the bottom rests against the tapering or beveled flange A when in use as a colander, thus giving additional strength to or bracing the bottom against the weight on the same. The bottom may be easily removed for the purpose of cleaning the same, or when it is desired to reverse the bottom or set it with its projecting portion upward in the vessel for steaming purposes, as clearly shown in Fig. 2, in which H represents a vessel in which steam may be generated, and K the top part of a stove on which said vessel H rests.

Wire-netting is preferably used, because of the impossibility of the condensed steam clinging to the same and thus water-soaking the food, and because of its non-liability to chokage or stoppage of the perforations, although finely-perforated sheet metal may be used when made in the form described.

Having thus described my invention, what I claim as new, and desire to secure by Letters Patent, is—

The hereinbefore-described culinary vessel, consisting of the cylindrical vessel having the narrow flange projecting laterally and inwardly from its lower edge, the tapering or beveled flange projecting downwardly and inwardly from said narrow flange, and the removable perforated bottom turned or struck up round its edge, whereby it may rest on said flanges when used as a colander, or be inverted and rest on the lateral flange only when used as a steamer, substantially as described.

G. L. MOTTER.

Witnesses:
JOSEPH SHOWALTER,
G. D. WINCHELL.